United States Patent
Chen et al.

(10) Patent No.: US 10,263,938 B2
(45) Date of Patent: Apr. 16, 2019

(54) MESSAGE PROCESSING METHOD AND APPARATUS

(71) Applicant: HUAWEI TECHNOLOGIES CO., LTD., Shenzhen, Guangdong (CN)

(72) Inventors: Heng Chen, Shanghai (CN); Yu Yin, Shanghai (CN); Dengjing Cao, Shanghai (CN); Weiming Huang, Shanghai (CN)

(73) Assignee: HUAWEI TECHNOLOGIES, Shenzhen (CN)

( * ) Notice: Subject to any disclaimer, the term of this patent is extended or adjusted under 35 U.S.C. 154(b) by 121 days.

(21) Appl. No.: 15/392,484

(22) Filed: Dec. 28, 2016

(65) Prior Publication Data

US 2017/0111306 A1    Apr. 20, 2017

Related U.S. Application Data

(63) Continuation of application No. PCT/CN2014/081303, filed on Jun. 30, 2014.

(51) Int. Cl.
| H04L 12/58 | (2006.01) |
| H04L 12/24 | (2006.01) |
| H04L 9/32 | (2006.01) |
| H04L 29/06 | (2006.01) |
| H04L 12/26 | (2006.01) |
| H04L 29/08 | (2006.01) |

(52) U.S. Cl.
CPC ............ H04L 51/30 (2013.01); H04L 41/069 (2013.01); H04L 41/507 (2013.01); H04L 43/065 (2013.01); H04L 51/00 (2013.01); H04L 67/22 (2013.01)

(58) Field of Classification Search
CPC .............................. H04L 51/30; H04L 41/069
See application file for complete search history.

(56) References Cited

U.S. PATENT DOCUMENTS

| 8,800,014 | B2* | 8/2014 | Nandakumar | H04L 9/321 |
| | | | | 726/16 |
| 2005/0276385 | A1* | 12/2005 | McCormick | H04L 41/069 |
| | | | | 379/1.02 |
| 2007/0010240 | A1* | 1/2007 | Gabler | H04L 63/30 |
| | | | | 455/423 |

FOREIGN PATENT DOCUMENTS

| CN | 101790180 A | 7/2010 |
| CN | 102034186 A | 4/2011 |
| CN | 102420700 A | 4/2012 |

(Continued)

OTHER PUBLICATIONS

International Search Report dated Apr. 3, 2015 in corresponding International Application No. PCT/CN2014/081303.

(Continued)

*Primary Examiner* — Kiet Tang
(74) *Attorney, Agent, or Firm* — Staas & Halsey LLP (57) ABSTRACT

Embodiments of the present invention provide a message processing method and apparatus, and relate to the field of communications technologies. The method includes: comparing a message feature of a currently processed message with a specified tracking feature; determining a user corresponding to the message as a target user when determining that the message feature matches the tracking feature; and reporting a signaling message of the target user to a network management server. In the present invention, a network fault is quickly located, and network connection efficiency is improved.

20 Claims, 3 Drawing Sheets

(56) References Cited

FOREIGN PATENT DOCUMENTS

| CN | 102427411 A | 4/2012 |
|---|---|---|
| CN | 102427423 A | 4/2012 |

OTHER PUBLICATIONS

International Search Report dated Apr. 3, 2015 in corresponding International Patent Application No. PCT/CN2014/081303.
Extended European Search Report dated May 24, 2017 in corresponding European Patent Application No. 14896854.8.
"Evolved Universal terrestrial Radio Access Network (E-UTRAN) S1 Application Protocol" 3GPP TSG RAN, 3GPP TS 36.413, $3^{rd}$ Generation Partnership Project, Valbonne, France, (Jun. 2014).
"Technical Specification Group Core Network and Terminals; Non-Access-Stratum (NAS) protocol for Evolved Packet System (EPS)" 3GPP TSG RAN, 3GPP TS 24.301, $3^{rd}$ Generation Partnership Project, Valbonne, France, (Jun. 2014).
"Mobility Management Entity (MME)—Visitor Location register (VLR) SGs interface specification" 3GPP TSG RAN, 3GPP TS 29.118, $3^{rd}$ Generation Partnership Project, Valbonne, France, (Jun. 2014).
"Mobility Management Entity (MME) and Serving GPRS Support Node (SGSN) related interfaces based on Diameter protocol" 3GPP TSG RAN, 3GPP TS 29.272, $3^{rd}$ Generation Partnership Project, Valbonne, France, (Jun. 2014).
"Evolved General Packet Radio Service (GPRS) Tunneling Protocol for Control plane" 3GPP TSG RAN, 3GPP TS 29.274, $3^{rd}$ Generation Partnership Project, Valbonne, France, (Jun. 2014).
"Evolved Packet System (EPS), 3GPP Sv interface (MME to MSC, and SGSN to MSC) for SRVCC" 3GPP TSG RAN, 3GPP TS 29.280, $3^{rd}$ Generation Partnership Project, Valbonne, France, (Jun. 2014).

\* cited by examiner

MESSAGE PROCESSING METHOD AND APPARATUS

CROSS-REFERENCE TO RELATED APPLICATIONS

This application is a continuation of International Application No. PCT/CN2014/081303, filed on Jun. 30, 2014, the disclosure of which is hereby incorporated by reference in its entirety.

TECHNICAL FIELD

The present disclosure relates to the field of communications technologies, and in particular, to a message processing method and apparatus.

BACKGROUND

With development of communications technologies, a communications network is becoming increasingly important in information communication. In the communications network, one network element usually provides a communications service for multiple users. Sometimes, a fault occurs when the network element provides the communications service, which causes a user communication failure. As people are more dependent on the communications network, people also impose higher requirements for reliability of the communications network. When a fault occurs in the communications network, people hope that a source of the network fault can be detected in time, and the fault can be located and rectified.

For example, when a communications service of a user becomes faulty, the user may make a complaint. After a user identifier (such as an IMSI or an IP address) of the user is obtained, it may be set in the network element to track communications signaling (including communication content) of the user identifier, and the information is presented to operation and maintenance personnel. The operation and maintenance personnel analyze and rectify the network fault by observing reported user tracking information. This solution of filtering and reporting communications signaling of a known and determined user identifier is referred to as user tracking.

User tracking can be implemented by delivering a user tracking instruction to the network element by using a tracking configuration console. Specifically, the operation and maintenance personnel send a user tracking instruction to the network element by using the tracking configuration console, and the user tracking instruction carries a user identifier of a to-be-tracked user. After receiving the user tracking instruction, the network element stores the user identifier into an internal tracking identifier database and sets the user corresponding to the identifier as a tracking target user. When a user registers with the network element and creates a user context, the network element obtains a user identifier from registration signaling and performs a query in the tracking identifier database to determine whether the user is a tracking target user; if yes, sets a tracking identifier in the user context, so that subsequent relevant signaling of the tracking target user can be reported to the tracking configuration console, and then the operation and maintenance personnel determine and rectify the network fault through observing and analyzing reported information.

In a process of implementing the present invention, the inventor finds that the prior art has at least the following problems:

A communications network serves an extremely large quantity of users. When it is observed or detected that a type of service indicator in the communications network has an obvious change (for example, a success rate of a user attach or activation procedure decreases; a success rate of a user PDP context activation procedure decreases; or a success rate of a CS Fallback SGs interface combined location update decreases), that is, a fault may exist in the network, a large quantity of users are usually affected due to communication service interruption caused by a same failure cause. Unless a user makes a complaint and an identifier (such as an IMSI) of the affected user is obtained, specific service-affected users cannot be determined soon from an indicator change. Therefore, a specific user identifier cannot be determined to establish user tracking, so as to help analyze and locate the network fault. Consequently, a network fault problem cannot be resolved in time, thereby lowering network usability.

SUMMARY

To implement network fault locating, embodiments of the present invention provide a message processing method and apparatus. The technical solutions are as follows:

According to a first aspect, an embodiment of the present invention provides a message processing method, where the method includes:
 comparing a message feature of a currently processed message with a specified tracking feature;
 determining a user corresponding to the message as a target user when determining that the message feature matches the tracking feature; and
 reporting a signaling message of the target user to a network management server.

With reference to the first aspect, in a first possible implementation manner of the embodiment of the present invention, the tracking feature includes one or a combination of multiple of: an interface type, a message type, an error code, or a specific value of a specific field in a message.

With reference to the foregoing possible implementation manner, in a second possible implementation manner of the embodiment of the present invention, the method further includes:
 randomly selecting a target user when the tracking feature is null.

With reference to the foregoing possible implementation manner, in a third possible implementation manner of the embodiment of the present invention, the method further includes:
 receiving a tracking task, where the tracking task carries a tracking feature; and
 storing the tracking feature into a tracking feature database.

With reference to the foregoing possible implementation manner, in a fourth possible implementation manner of the embodiment of the present invention, after the determining a user corresponding to the message as a target user when the message feature matches the tracking feature, the method further includes:
 when duration for tracking a signaling message of a target user reaches the switching duration, disabling a tracking task and re-selecting a target user.

With reference to the foregoing possible implementation manner, in a fifth possible implementation manner of the embodiment of the present invention, after the determining a user corresponding to the message as a target user when the message feature matches the tracking feature, the method further includes:

setting a tracking identifier in a context of the target user, and obtaining, according to the tracking identifier, a signaling message of the target user in a communication process; or recording a user identifier of the target user into an object tracking database, and obtaining, according to the user identifier, a signaling message of the target user in a communication process.

According to a second aspect, an embodiment of the present invention provides a message processing apparatus, where the apparatus includes:

a processing unit, configured to compare a message feature of a currently processed message with a specified tracking feature, and determine a user corresponding to the message as a target user when determining that the message feature matches the tracking feature; and a sending unit, configured to report a signaling message of the target user to a network management server.

With reference to the second aspect, in a first possible implementation manner of the embodiment of the present invention, the tracking feature includes one or a combination of multiple of: an interface type, a message type, an error code, or a specific value of a specific field in a message.

With reference to the foregoing possible implementation manner, in a second possible implementation manner of the embodiment of the present invention, the processing unit is further configured to randomly select a target user when the tracking feature is null.

With reference to the foregoing possible implementation manner, in a third possible implementation manner of the embodiment of the present invention, the apparatus further includes:

a receiving unit, configured to receive a tracking task, where the tracking task carries a tracking feature; and a storage unit, configured to store the tracking feature into a tracking feature database.

With reference to the foregoing possible implementation manner, in a fourth possible implementation manner of the embodiment of the present invention, the processing unit is further configured to: when duration for tracking a signaling message of a target user reaches the switching duration, disable a tracking task and re-select a target user.

With reference to the foregoing possible implementation manner, in a fifth possible implementation manner of the embodiment of the present invention, the apparatus further includes:

a tracking identifier setting unit, configured to set a tracking identifier in a context of the target user, and trigger, according to the tracking identifier, the obtaining module to obtain a signaling message of the target user in a communication process; or a user identifier recording unit, configured to record a user identifier of the target user into an object tracking database, and trigger, according to the user identifier, the obtaining module to obtain a signaling message of the target user in a communication process.

Beneficial effects of the technical solutions provided in the embodiments of the present invention are as follows:

In the method and apparatus provided in the embodiments of the present invention, according to a network fault phenomenon, a message feature that may relate to the network fault phenomenon is set as a tracking feature. When processing a message procedure of a user, a network element performs matching between a processed message and the specified tracking feature; if the matching succeeds, selects the being-processed user as a tracking object and reports a subsequent signaling message of the user to assist in locating a cause of a network fault that possibly occurs. After a signaling procedure of a user fails, usually continual attempts are to be made. Therefore, it is relatively easy to obtain by analysis a specific cause of a network fault from a tracked signaling message subsequently reported by a selected tracking object, which accelerates fault rectification. Compared with the prior art, in the present invention, it is not required to obtain a specific identifier of a user who encounters a fault, but it is only required to determine a corresponding message filtering feature from a fault phenomenon. A network element can automatically match a message procedure conforming to a tracking feature, thereby resolving a problem that when a network fault occurs, it is difficult for a person to quickly determine a user affected by the fault and to establish conventional user tracking to assist in problem analyzing and locating, because the network element simultaneously processes message procedures of a large quantity of users. This manner better conforms to a general process of network fault locating, makes it relatively easy to obtain by analysis a specific cause of a network fault, and can accelerate fault rectification, thereby providing an effective tool to ensure quick network fault locating and rectification and improve network usability.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

For ease of understanding the embodiments of the present invention, the following introduces a network element, a service object of the network element, and other related concepts involved in the embodiments of the present invention.

A GPRS wireless communications network is used as an example. Related network elements include a BSC (Base Station Controller), an RNC (Radio Network Controller), an SGSN (Serving GPRS Support Node), a GGSN (Gateway GPRS Support Node), and the like. A service object of the network elements is referred to as UE (User Equipment) in network terms of the network elements.

In an LTE network, related network elements include an eNodeB (Evolved Node B), an MME (Mobility Management Entity), an S-GW (Serving Gateway), a P-GW (Packet data Gateway), an HSS (Home Subscriber Server), a PCRF (Policy and Charging Rules Function), an OCS (Online Charging System), and the like. Similarly, user equipment served by the network elements is also referred to as UE.

In a specific network element, according to a layer at which the network element is located in a network protocol stack, there are different identifiers to identify a service object. For example, in core networks of GPRS and LTE, network elements such as an SGSN, a GGSN, an MME, an S-GW, a P-GW, an HSS, and a PCRF generally use one or more of an IMSI (International Mobile Subscriber Identification Number), an MSISDN (Mobile Subscriber International ISDN/PSTN number), an IMEI (International Mobile Equipment Identity), or a UE IP address to identify the UE.

Figure 1:
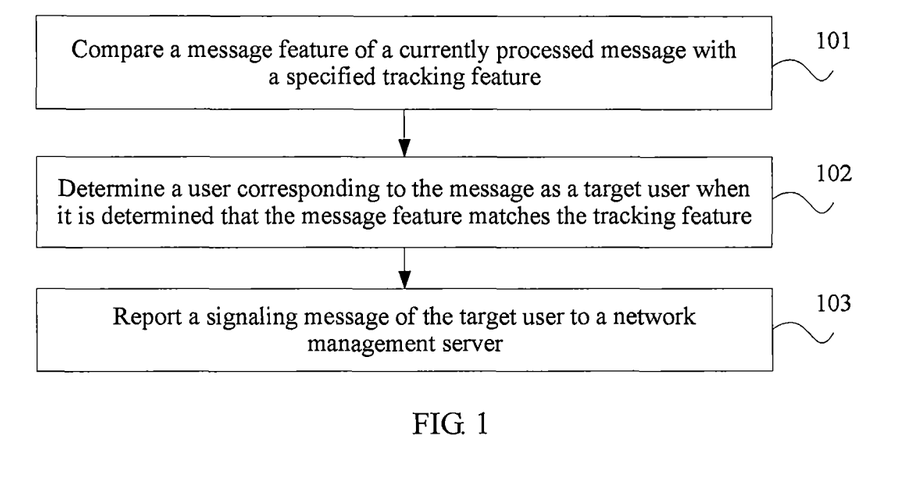
FIG. 1 is a flowchart of a message processing method according to a first embodiment of the present invention.

FIG. 1 is a flowchart of a message processing method according to an embodiment of the present invention. Referring to FIG. 1, the method includes the following steps:

101. Compare a message feature of a currently processed message with a specified tracking feature.

102. Determine a user corresponding to the message as a target user when determining that the message feature matches the tracking feature.

103. Report a signaling message of the target user to a network management server.

In the method provided in this embodiment of the present invention, according to a fault phenomenon in a network, a message feature that may relate to the network fault phenomenon is set as a tracking feature. When processing a message procedure of a user, a network element performs matching between a processed message and the specified tracking feature; if the matching succeeds, selects the being-processed user as a tracking object and reports a subsequent signaling message of the user to assist in locating a cause of a network fault that possibly occurs. After a signaling procedure of a user fails, usually continual attempts are to be made. Therefore, it is relatively easy to obtain by analysis a specific cause of a network fault from a tracked signaling message subsequently reported by a selected tracking object, which accelerates fault rectification. Compared with the prior art, in the present invention, it is not required to obtain a specific identifier of a user who encounters a fault, but it is only required to determine a corresponding message filtering feature from a fault phenomenon. A network element can automatically match a message procedure conforming to a tracking feature, thereby resolving a problem that when a network fault occurs, it is difficult for a person to quickly determine a user affected by the fault and to establish conventional user tracking to assist in problem analyzing and locating, because the network element simultaneously processes message procedures of a large quantity of users. This manner better conforms to a general process of network fault locating, makes it relatively easy to obtain by analysis a specific cause of a network fault, and can accelerate fault rectification, thereby providing an effective tool to ensure quick network fault locating and rectification and improve network usability.

Figure 2:
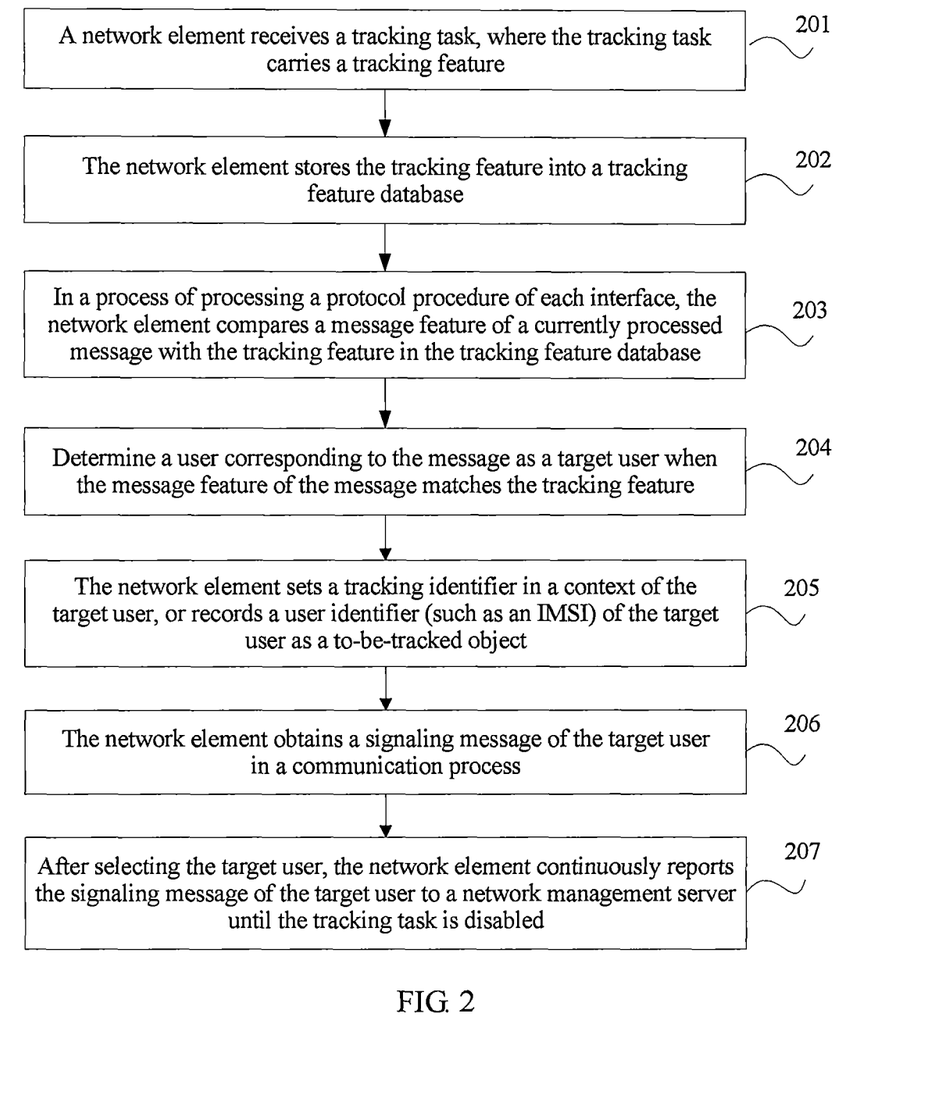
FIG. 2 is a flowchart of a message processing method according to a second embodiment of the present invention.

FIG. 2 is a flowchart of a message processing method according to an embodiment of the present invention. Referring to FIG. 2, the method includes the following steps:

201. A network element receives a tracking task, where the tracking task carries a tracking feature.

The tracking feature is set according to an occurred network fault phenomenon. For example, if network performance statistics reflect that a success rate of an attach procedure decreases, the tracking feature may be set as a tracking attach reject message, that is, a message type is Attach Reject.

The tracking feature may be set to null, that is, the network element selects a user from processed users as a tracking target user.

In this embodiment of the present invention, the tracking task may be sent by a tracking management terminal to the network element, where the tracking management terminal is a device, in a communications network, to manage a tracking task of the network element. The tracking management terminal may send the tracking task to the network element, and also receive a tracking message reported by the network element. Operation and maintenance personnel learn, by observing the reported tracking message, a situation of processing a message procedure by the network element. Certainly, there may be many different implementation manners of delivering the tracking task to the network element and receiving the tracking message reported by the network element, such as a fixed matching condition that is directly built in the network element, which is not limited in the present invention.

The tracking feature is obtained by manually or automatically mapping the occurred network fault phenomenon to a corresponding message feature according to knowledge and experience of network operation and maintenance. For example, when a success rate indicator of a specific procedure in the network decreases, reject messages for the specific procedure definitely increase. The tracking feature is set as a reject message that matches the procedure, and it is possible to capture a user and a procedure of the user that are affected by the fault phenomenon.

The tracking feature may be one or a combination of multiple of: an interface type, a message type, an error code, or a specific value of a specific field in a message.

The interface type may refer to an interface to which a matched message belongs, such as an S1 interface, an Iu interface, a Gb interface, an S11 interface, an S6 interface, an SGs interface, an Sv interface, a Gx interface, or a Gy interface in an EPC network. If a message processed by the network element belongs to the specific interface, it indicates that matching succeeds.

A message type name may be a specific message type processed by the network element, and each interface has respective message type definition, such as an Attach Request message, an Attach Reject message, a Service Request message, a Create Session Request message, and a Create Session Response message.

The error code may refer to a field, in some message types, specially used to indicate whether an operation succeeds and a specific failure cause.

A specific field in a message is a more commonly used concept, that is, any field in a specific message of each interface of the network element can be used for feature matching in this solution. Actually, the foregoing message type and error code are also specific fields in a message. A field definition of each message, a meaning of a value, and the like are described in a standard protocol of each interface. Different fields may be used to match a public feature of an expected-to-match user group when different fault phenomena occur. For example, in an Attach Request message of the S1 interface, an EPS attach type field indicates an attach type, and an optional value specified in the current protocol is:

EPS attach: common EPS attach;
combined EPS/IMSI attach: combined EPS/IMSI attach, that is, attach supporting a CS Fallback capability; and
EPS emergency attach: EPS emergency attach.

If determining that a fault phenomenon is associated with the combined attach or the emergency service attach, by setting, in a feature matching condition, a specific value that matches an EPS attach type field in the Attach Request message, a user who is performing a corresponding procedure and a signaling message procedure of the user can be quickly matched.

It should be noted that the tracking feature may be any piece of the foregoing content or a combination of multiple pieces of content, for example, matching a specific message type that carries a specific error code, or a specific message type of a specific value equal to a field in a message. In addition to equal to, a matching condition (operator) may be unequal to, greater than, less than, between, starting from (prefix matching), ending at (suffix matching), or the like.

The tracking feature may be null, and the network element selects a user from currently being-processed users as a target user.

Specifically, in a communications network, operation and maintenance personnel find that an MME network element encounters a decreasing attach success rate, and suspect that this is caused by a setup failure of a default bearer between the MME and an S-GW or a P-GW. To locate the problem, the operation and maintenance personnel hope to obtain information about a related user failing to attach, then deliver a tracking task to the MME, and set a message tracking matching condition as: a message type is Attach Reject, or an error code in a message is #19 ESM Failure. The error code indicates that an attach failure is caused by the setup failure of the default bearer between the MME and the S-GW or the P-GW. The tracking task carries the message feature matching condition, and sends the message feature matching condition to the network element; the network element receives the tracking task.

202. The network element stores the tracking feature into a tracking feature database.

In this embodiment of the present invention, the tracking feature database is an internal module, in the network element, configured to manage and store the tracking task and the tracking feature of the tracking task. The network element may store, in the database, information such as a message type name, an error code in a message, and a value of a specific field in a message that are in the tracking feature; a combination relationship among all conditions (and indicates that multiple matching conditions need to be satisfied simultaneously; or indicates that only one of multiple matching conditions needs to be satisfied); and conditional operators (greater than, less than, between, unequal to, and the like). The tracking feature database supports a tracking function of the network element by storing the information, and updates and expands at any time, according to information sent by the network element, a task and a matching condition that are stored in the database.

Specifically, if the tracking feature in the delivered tracking task received by the network element includes a message type being an S1-NAS interface attach reject message and an error code, in a message, being a #19 ESM Failure, the S1-NAS interface attach reject message and a matching condition parameter in which a value of an error code field is equal to #19 ESM Failure are correspondingly stored into the message type and the error code of the tracking feature database for convenience of subsequent use.

203. In a process of processing a protocol procedure of each interface, the network element compares a message feature of a currently processed message with the tracking feature in the tracking feature database.

In this embodiment of the present invention, the network element needs to perform mutual message transmission with users by using each interface. The network element has many interfaces. For example, some of interfaces supported by the MME include: an S1-MME interface to an eNodeB (3GPP 36.413), an S6a interface to an HSS (3GPP 29.272), an S11 interface to an S-GW (3GPP 29.274), an SGs interface to an MSC (3GPP 29.118), and an Sv interface (3GPP 29.280). Similarly, other network elements also support multiple interfaces. For example, some of interfaces supported by the P-GW include: an S5/S8 interface to an S-GW (3 gpp 29.274) and a Gx interface to a PCRF (3GPP 29.112). For different network elements, such as an HSS, an EIR, an SGSN, a GGSN, an MSC, a PCRF, and a P-CSCF, interfaces supported by the network elements may have various variations, and details are not described herein.

In a message exchanging process between a network element and a user, the network element may provide multiple different external interfaces, and each interface respectively has a supported protocol, that is, a message format definition on each interface is different. An NAS (Non Access Stratum) interface of a network element MME (Mobility Management Entity) of a core network in an LTE network is used as an example. Table 1 below lists various message types, error codes, and target specific values of a specific field in a message that are corresponding to the MME. For a complete interface message definition, refer to a protocol text 3GPP 24.301. When a tracking feature is being set, all or a part of setting conditions shown in Table 1 may be selected as the tracking feature, used to compare with a message feature of a message exchanged on each interface.

In Table 1, content of the setting condition includes a message type, an error code, and a target specific value of a specific field in a message. The message type may be an Attach Request, an Attach Accept, an Attach Reject, a Detach Request, a Service Request, and the like; the error code may be IMSI unknown (#2), illegal user equipment (#3), IMEI not accepted (#4), and the like; the target specific value of a specific field in a message may be an EPS attach type, a Service Type, and the like.

TABLE 1

| Setting condition | Parameter example |
| --- | --- |
| Message type | Attach Request |
| | Attach Accept |
| | Attach Reject |
| | Detach Request |
| | Service Request |
| | Service Reject |
| | Tracking Area Update |
| | Tracking Area Update Accept |
| | Tracking Area Update Reject |
| | Extended Service Request |
| | Bearer Setup request |
| Error code | #2, IMSI unkown in HSS |
| | #3, Illegal UE |
| | #4, IMEI not Accepted |
| | . . . |
| | #16, MSC temporarily not reachable |
| | . . . |
| | #18, CS domain not available |
| | . . . |

TABLE 1-continued

| Setting condition | Parameter example |
|---|---|
| Target specific value of a specific field in a message | EPS Attach Type Service Type |

Specifically, in the process of processing the protocol procedure of each interface, the network element receives and processes a large quantity of interaction messages. The network element compares information of each message with the tracking feature. In the foregoing instance, if a comparison result is that a being-processed message type is an S1-NAS interface attach reject message, and an error code in the message is a #19 ESM Failure, it indicates that matching succeeds, and then step 204 is performed.

204. Determine a user corresponding to the message as a target user when the message feature of the message matches the tracking feature.

In this embodiment of the present invention, being matched indicates that a message feature processed by the network element conforms to the tracking feature carried by the tracking task in the tracking feature database.

A user to which the message belongs is determined as a target user when determining that the processed message feature conforms to the tracking feature.

There is another case in step 204. In step 201, the tracking feature carried in the tracking task may be null. When the tracking feature is null, in the process of processing the protocol procedure of each interface, the network element randomly selects a target user.

Specifically, when the tracking feature is set to null, in the process of processing the protocol procedure of each interface, the network element does not extract a message feature of a processed interaction message, but in the processed interaction message, randomly selects a user corresponding to the interaction message and determines the user as a target user.

205. The network element sets a tracking identifier in a context of the target user, or records a user identifier (such as an IMSI) of the target user as a to-be-tracked target, so as to set a tracking identifier in a user context when the user attempts to recreate the user context.

That is, the user identifier of the target user is recorded in an object tracking database, so as to subsequently set the tracking identifier in the user context according to the user identifier when the user attempts to recreate the user context, so that a signaling message of the target user in a communication process can be obtained.

206. The network element obtains a signaling message of the target user in a communication process.

Specifically, after determining the target user and setting the tracking identifier in the user context, when subsequently processing a message related to the user, the network element may obtain a subsequent interaction message of the target user in the communication process. If the user performs again an attach request signaling procedure in which an error occurs previously, the network element can learn a situation of performing the signaling procedure this time, and reports the situation to the tracking management terminal. The operation and maintenance personnel can locate the network fault according to the information reported by the network element.

It should be noted that for a message matching the tracking feature, such as the attach reject message in the foregoing example, according to different implementation, the network element may select to report the obtained signaling message, or may start reporting from next subsequent signaling, which is not limited in this embodiment of the present invention.

207. After selecting the target user, the network element continuously reports the signaling message of the target user to a network management server, until the tracking task is disabled.

It should be noted that step 207 is an optional step. Switching duration may be set in order to collect more signaling message samples of the target user that conform to a fault feature. When duration for tracking a signaling message of a target user reaches the switching duration, a tracking task is disabled, a target user is re-selected, and step 206 is performed.

Specifically, if the network element sets the switching duration to 5 minutes, timing starts from a moment when the network element tracks a signaling message of a determined target user. When duration for tracking the signaling message by the network element reaches 5 minutes, the network element re-selects a new target user that matches the tracking feature condition, and reports a signaling message of the new target user. Because the network element may be unable to immediately match a new target user at the instant of reaching the switching duration, after the switching duration is reached, the network element may start to match a new target user conforming to the condition, and continue to report a signaling message of an original target user until the new target user is successfully matched; and then perform switching. Certainly, after the switching duration is reached, the network element may immediately stop reporting a signaling message of an original target user until the new target user is successfully matched, and then report a signaling message of the new target user.

In this embodiment of the present invention, a quantity of target users is not limited. Multiple users conforming to the tracking feature may be selected simultaneously as target users, and signaling messages of the multiple target users are simultaneously reported to accelerate fault situation analysis and locating.

The network element may have multiple to-be-tracked target users, and step 206 may have any one of the following cases:

(1) When a first quantity of target users are determined, message signaling of target users of the first quantity is obtained in a communication process.

Specifically, a quantity of target users determined by the network element may not be unique, and therefore, multiple target users may be tracked at the same time. When the network element determines five target users, the network element sets tracking identifiers for the five target users, and obtains message signaling of the five target users in a communication process.

(2) When a first quantity of target users are determined, a second quantity of target users are selected from the first quantity of target users, and message signaling of target users of the second quantity is obtained in a communication process. The second quantity is less than the first quantity.

Specifically, the network element may determine various users who match a target tracking feature. However, in practical application, a processing capability of the network element is limited. The network element may limit a quantity of target users to be tracked actually, so as to avoid affecting another service of the network element. For example, 30 target users are determined. If all the 30 target users are tracked, the network element is overloaded, and a processing speed of the network element slows down. Therefore, the network element selects 10 target users from the 30 target users to track, and obtains message signaling of the 10 target users in a communication process.

(3) When a third quantity of target users are determined, message signaling of target users of the third quantity is obtained in a communication process, and when duration for tracking any one of the target users of the third quantity reaches the switching duration, a target user is re-selected.

Specifically, the network element may track each target user at a different start time; therefore, at a same moment, the network element may maintain tracking for multiple target users. However, because a start time is different, when the switching duration is set, a corresponding end time may be also different. In this way, when duration for tracking any target user reaches the switching duration, a target user may be re-selected to avoid a tracking resource waste of the network element.

For example, when the network element determines 10 target users, and the switching duration is 5 minutes, the network element obtains message signaling of the 10 target users, and at the time of starting tracking, records duration for tracking each target user. When duration for tracking any one of the 10 target users reaches 5 minutes, the network element stops tracking a message of the target user and re-selects a target user; and after the re-selecting, a quantity of target users cannot be greater than 10.

It should be noted that the switching duration is used to ensure tracking flexibility. If a network fault is not located within the switching duration, a tracking object can be changed quickly to implement network fault locating. However, in a practical application scenario, a user determined according to a message feature has a relatively high possibility of encountering a network fault; therefore, the switching duration may not be set, but the determined user is continuously tracked until network fault locating succeeds.

Figure 3:
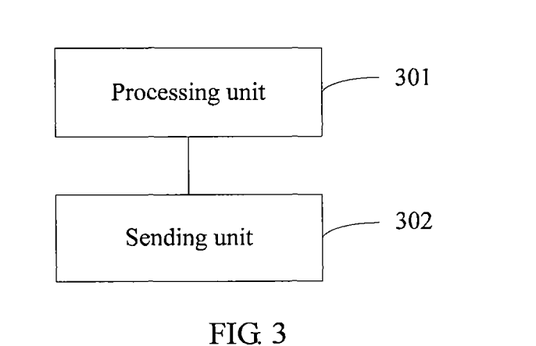
FIG. 3 is a schematic structural diagram of a message processing apparatus according to a third embodiment of the present invention.

Referring to FIG. 3, an embodiment of the present invention provides a schematic structural diagram of a message processing apparatus. Referring to FIG. 3, the apparatus includes a processing unit 301 and a sending unit 302.

The processing unit 301 is configured to compare a message feature of a currently processed message with a specified tracking feature, and determine a user corresponding to the message as a target user when determining that the message feature matches the tracking feature.

The sending unit 302 is configured to report a signaling message of the target user to a network management server.

Optionally, the tracking feature includes one or a combination of multiple of: an interface type, a message type, an error code, or a specific value of a specific field in a message.

Optionally, the processing unit 301 is further configured to randomly select a target user when the tracking feature is null.

Optionally, the apparatus further includes:
a receiving unit, configured to receive a tracking task, where the tracking task carries a tracking feature; and
a storage unit, configured to store the tracking feature into a tracking feature database.

Optionally, the processing unit 301 is further configured to: when duration for tracking a signaling message of a target user reaches the switching duration, disable a tracking task and re-select a target user.

Optionally, the apparatus further includes:
a tracking identifier setting unit, configured to set a tracking identifier in a context of the target user, and trigger, according to the tracking identifier, the obtaining module to obtain a signaling message of the target user in a communication process; or
a user identifier recording unit, configured to record a user identifier of the target user into an object tracking database, and trigger, according to the user identifier, the obtaining module to obtain a signaling message of the target user in a communication process.

It should be noted that when the message processing apparatus provided in the foregoing embodiment is tracking a message, description is given only using division of the foregoing functional modules. In practice, the functions may be allocated to different functional modules for implementation as required. That is, an internal structure of the device is divided into different functional modules to implement all or a part of the functions described above. In addition, the message processing apparatus and the message processing method that are provided in the foregoing embodiments pertain to a same concept; for a specific implementation process, refer to the method embodiment, and details are not described herein.

An embodiment of the present invention further provides a network element device, where the network element device includes a transmitter, a receiver, a memory, and a processor separately connected to the transmitter, the receiver, and the memory. Certainly, the network element device may further include general components, such as an antenna, a baseband processing component, an intermediate radio frequency processing component, and an input/output apparatus. This embodiment of the present invention sets no limitation thereto.

The memory stores a group of program code, and the processor is configured to invoke the program code stored in the memory, so as to perform the following operations:
comparing a message feature of a currently processed message with a specified tracking feature;
determining a user corresponding to the message as a target user when determining that the message feature matches the tracking feature; and
reporting a signaling message of the target user to a network management server.

The tracking feature includes one or a combination of multiple of: an interface type, a message type, an error code, or a specific value of a specific field in a message.

The method further includes:
randomly selecting a target user when the tracking feature is null.

The method further includes:
receiving a tracking task, where the tracking task carries a tracking feature; and
storing the tracking feature into a tracking feature database.

After the determining a user corresponding to the message as a target user when the message feature matches the tracking feature, the method further includes:
when duration for tracking a signaling message of a target user reaches the switching duration, disabling a tracking task and re-selecting a target user.

After the determining a user corresponding to the message as a target user when the message feature matches the tracking feature, the method further includes:
setting a tracking identifier in a context of the target user, and obtaining, according to the tracking identifier, a signaling message of the target user in a communication process; or
recording a user identifier of the target user into an object tracking database, and obtaining, according to the user identifier, a signaling message of the target user in a communication process.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the principle of the present invention shall fall within the protection scope of the present invention.

What is claimed is:

1. A message processing apparatus comprising:
   a non-transitory computer readable storage medium to store one or more programs, and
   computer hardware configured to implement the one or more programs to control:
      a receiver configured to receive a tracking task which carries a tracking feature;
      a processor configured to compare a message feature of a currently processed message with the tracking feature, and determine a user corresponding to the currently processed message as a target user when determining that the message feature matches the tracking feature based on the comparison; and
      a transmitter configured to continuously report a signaling message of the target user to a network management server until the tracking task with respect to the target user is disabled, the tracking task with respect to the target user being selectively disabled when a preset duration of time expires.

2. The message processing apparatus according to claim 1, wherein the tracking feature includes at least one of an interface type, a message type, an error code, or a specific value of a specific field in a message.

3. The message processing apparatus according to claim 1, wherein the processor is further configured to randomly select the target user when the tracking feature is null.

4. The message processing apparatus according to claim 1, further comprising:
   a memory configured to store the tracking feature in a tracking feature database,
   wherein the receiver receives the tracking task from the network management server.

5. The message processing apparatus according to claim 1, wherein the processor is further configured to: when the preset duration of time expires, disable the tracking task with respect to the target user.

6. The message processing apparatus according to claim 1, wherein the processor is further configured to set a tracking identifier in a context of the target user, and trigger, according to the tracking identifier, the receiver to receive the signaling message of the target user in a communication process.

7. The message processing apparatus according to claim 1, wherein the processor is further configured to record a user identifier of the target user in an object tracking database, and trigger, according to the user identifier, the receiver to receive the signaling message of the target user in a communication process.

8. The message processing apparatus according to claim 1, wherein the preset duration of time begins at a time when the processor determines the user corresponding to the currently processed message as the target user.

9. The message processing apparatus according to claim 1, wherein when the preset duration of time expires, the processor is configured to determine a new target user by comparing another message feature of another currently processed message with the tracking feature and by determining another user corresponding to the another currently processed message as the new target user when determining that the another message feature of the another currently processed message matches the tracking feature based on the comparing.

10. The message processing apparatus according to claim 9, wherein the tracking task is disabled with respect to the target user immediately when the preset duration of time expires.

11. The message processing apparatus according to claim 9, wherein when the preset duration of time expires, disabling of the tracking task with respect to the target user is delayed until the processor determines the new target user.

12. The message processing apparatus according to claim 1, wherein
   the transmitter is configured to continuously report signaling messages of a plurality of target users to the network management server, and
   a time at which the preset duration of time expires with respect to each of the plurality of target users is different from one another.

13. The message processing apparatus according to claim 12, wherein
   the apparatus limits a number of the plurality of target users according to a processing speed of the apparatus.

14. A message processing method, comprising:
   receiving a tracking task which carries a tracking feature;
   comparing a message feature of a currently processed message with the tracking feature;
   determining a user corresponding to the currently processed message as a target user when determining that the message feature matches the tracking feature based on the comparing; and
   continuously reporting a signaling message of the target user to a network management server until the tracking task with respect to the target user is disabled, the tracking task with respect to the target user being selectively disabled when a preset duration of time expires.

15. The message processing method according to claim 14, wherein the tracking feature includes at least one of an interface type, a message type, an error code, or a specific value of a specific field in a message.

16. The message processing method according to claim 14, wherein the method further comprises:
   randomly selecting the target user when the tracking feature is null.

17. The message processing method according to claim 14, further comprising:
   storing the tracking feature in a tracking feature database,
   wherein the tracking task is received from the network management server.

18. The message processing method according to claim 14, further comprising:
   when the preset duration of time expires, disabling the tracking task with respect to the target user.

19. The message processing method according to claim 14, further comprising:
   setting a tracking identifier in a context of the target user, and obtaining, according to the tracking identifier, the signaling message of the target user in a communication process.

20. The message processing method according to claim 14, further comprising:

recording a user identifier of the target user in an object tracking database, and obtaining, according to the user identifier, the signaling message of the target user in a communication process.

\* \* \* \* \*

UNITED STATES PATENT AND TRADEMARK OFFICE
CERTIFICATE OF CORRECTION

PATENT NO. : 10,263,938 B2
APPLICATION NO. : 15/392484
DATED : April 16, 2019
INVENTOR(S) : Heng Chen et al.

Page 1 of 1

It is certified that error appears in the above-identified patent and that said Letters Patent is hereby corrected as shown below:

On the Title Page

In Item (73) Assignee, after "HUAWEI TECHNOLOGIES" insert --CO., LTD.--.

Signed and Sealed this
Third Day of March, 2020

Andrei Iancu
*Director of the United States Patent and Trademark Office*